United States Patent
Diebels et al.

(10) Patent No.: US 8,307,627 B2
(45) Date of Patent: Nov. 13, 2012

(54) METHOD AND DEVICE FOR MONITORING THE FORMATION OF DEPOSITS OF SOLID PARTICLES, PARTICULARLY IN A FUEL LINE AND IN THE FUEL VALVES OF A GAS TURBINE

(75) Inventors: Andreas Diebels, Bottrop (DE); Bernd Prade, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 879 days.

(21) Appl. No.: 12/083,032

(22) PCT Filed: Oct. 5, 2006

(86) PCT No.: PCT/EP2006/067102
§ 371 (c)(1),
(2), (4) Date: Apr. 14, 2009

(87) PCT Pub. No.: WO2007/039638
PCT Pub. Date: Apr. 12, 2007

(65) Prior Publication Data
US 2010/0031659 A1    Feb. 11, 2010

(30) Foreign Application Priority Data
Oct. 6, 2005    (EP) .................... 05021821

(51) Int. Cl.
*F02C 9/00*   (2006.01)
*F02G 3/00*   (2006.01)
(52) U.S. Cl. ........ 60/39.281; 60/39.24; 60/734; 60/779; 431/12; 137/486; 340/606

(58) Field of Classification Search ............... 60/39.281, 60/39.24, 39.27, 772, 779, 734, 746, 747; 431/12, 13, 17, 89; 137/486, 487.5, 100, 137/554, 101.19; 340/606
See application file for complete search history.

(56) References Cited

U.S. PATENT DOCUMENTS

| | | | |
|---|---|---|---|
| 5,549,137 A * | 8/1996 | Lenz et al. ................. 137/486 |
| 6,165,272 A * | 12/2000 | Liu ........................... 118/715 |
| 6,247,919 B1 | 6/2001 | Welz, Jr. et al. | |
| 6,279,870 B1 | 8/2001 | Welz, Jr. et al. | |
| 7,335,396 B2 * | 2/2008 | Carpenter et al. ......... 427/248.1 |
| 8,042,528 B2 * | 10/2011 | Gates et al. .............. 123/568.21 |
| 2003/0192300 A1 | 10/2003 | Mahoney et al. | |
| 2004/0031268 A1 | 2/2004 | Wilkes | |
| 2007/0044768 A1 * | 3/2007 | Eick et al. ................. 123/478 |

* cited by examiner

*Primary Examiner* — William H Rodriguez

(57) ABSTRACT

A process is disclosed for monitoring the formation of deposits of solid particles in a fuel line having a valve. A measure for the deposits of solid particles in the fuel line is determined by determining the degree of opening of the valve passage and the quantity of fuel flowing through the valve, and by comparing them with a previously determined control value which characterizes the deposit-free line. Also disclosed is a device for monitoring the formation of deposits of solid particles in a fuel line having a valve, the device having a measurement system for determining the current fuel flow and a measurement system for determining the current valve position, as well as an evaluation system connected to the measurement systems. Also disclosed is a combustion chamber comprising a device and operated by a process according to the invention, and a gas turbine with said combustion chamber.

20 Claims, 1 Drawing Sheet

Valve Stroke

METHOD AND DEVICE FOR MONITORING THE FORMATION OF DEPOSITS OF SOLID PARTICLES, PARTICULARLY IN A FUEL LINE AND IN THE FUEL VALVES OF A GAS TURBINE

CROSS REFERENCE TO RELATED APPLICATIONS

This application is the US National Stage of International Application No. PCT/EP2006/067102, filed Oct. 5, 2006 and claims the benefit thereof. The International Application claims the benefits of European application No. 05021821.3 filed Oct. 6, 2005, both of the applications are incorporated by reference herein in their entirety.

FIELD OF INVENTION

The invention relates to a method for monitoring the formation of deposits of solid particles in a fuel feed line with a valve. The invention also relates to a device for monitoring these deposits. Both the method and the device are designed to be used in gas turbine plants and other firing installations such as boiler firing systems.

BACKGROUND OF THE INVENTION

A gas turbine plant comprises at least a compressor, a combustion chamber and a turbine. In the compressor, aspirated air is compressed before a fuel is then added. This mixture is burned in the combustion chamber. The combustion exhaust gases are then fed to the turbine to generate power.

Gas turbine plants are nowadays equipped with multistage combustion chambers containing a plurality of burner stages to be operated in parallel with one another. These burner stages can be operated individually or jointly depending on the capacity utilization of the gas turbine plant. In addition to at least one main burner stage, the parallel burner stages comprise at least one pilot burner stage, the major part of the fuel being fed to the main burner stage.

Variations in the fuel flow supplied to the main and pilot burner stage result in output fluctuations and increased NOx emissions due to unstable combustion conditions. The output or more specifically the low NOx emissions are generally kept constant by controlling the fuel flow supplied to the main fuel stage and pilot fuel stage which are equipped with a size adjustable valve for this purpose. The fuel is generally present in gaseous form. In addition to solid particles already contained in the fuel, solid particles may be formed e.g. by sublimation of the fuel, particularly of sulfur contained in the fuel. These may be deposited inside the pipework.

However, deposits of solid particles in the fuel lines result in displacements of the valve characteristic and therefore in the fuel split, i.e. in the relative distribution of the fuel to the burner stages. In addition, there is a risk that less fuel is fed to individual stages or burners than is necessary for combustion. This results in increased emissions and combustion instabilities. In order to determine the extent of the deposits and, in the case of heavy deposits, to instigate cleaning action, the gas turbine plant has so far had to be shut down which is a very disadvantageous.

SUMMARY OF INVENTION

The object of the invention is therefore to specify a service-friendly method for monitoring the solid particles and the associated deposits, but where possible without having to accept plant downtimes. Another object is to specify a device which in particular allows said monitoring. Both the method and the device shall be deployable in a gas turbine.

In its methodological aspect, this object is inventively achieved by a method for monitoring the formation of deposits of solid particles in a fuel feed line incorporating a valve, a measure for the deposits of solid particles in the fuel feed line being established by determining the degree of opening of the valve passageway and the amount of fuel flowing through the valve and comparing them with a previously established reference characterizing the deposit-free line.

The invention is based on the experience that the amount of fuel flowing through the valve in the line must be constantly readjusted. However, the deposits cause the effective flow cross section of the line to be reduced. This is associated with a low and disturbed flow of fuel through the line. However, the fuel flow is to be kept as constant is possible for a particular operating state: In order to achieve this, the valve is opened wider than would be necessary for a deposit-free line. Due to the greater degree of opening compared to the deposit-free line, a larger fuel flow is now admitted through the valve in order to keep the fuel flow in the line itself constant. In the case of the deposit-free line, the greater degree of opening would mean an increase in the amount of fuel admitted.

The invention is based on the approach that the extent of the deposits is determined by the additionally necessary degree of opening of the valve, i.e. the degree of opening of the valve of the deposit-fouled line compared to the degree of opening of the deposit-free line.

The extent of the deposits is now determined by means of the degree of opening of the valve. For this purpose different references characterizing a clean line without deposits are determined in advance. These references are each determined depending on the conditions, e.g. type of fuel. The required fuel flow through the valve with deposits present is measured. This is applied to the reference. This enables the theoretical degree of opening of the valve for this fuel flow in the case of a theoretically deposit-free line to be determined. This calculated degree of opening is now compared with the currently obtaining degree of opening of the valve. The change in the degree of opening for a deposit-free as compared to a deposit-fouled line correlates with the change in fuel flow for a deposit-free as compared to a deposit-fouled line. Therefore, if the change in the degree of opening is very large, a very much larger fuel flow would be admitted by the valve assumed to be deposit-free than is originally necessary to keep the fuel flow in the line constant. Consequently, a large number of solid particles have been deposited in the line, and vice versa.

The extent of the deposits is determined without visual inspection in a gas turbine plant, for example, i.e. without shutting down the plant for periods of time. This method enables the deposits to be monitored in situ, so that proactive measures to prevent clogging of the line can be initiated in good time, while at the same time maintaining plant availability.

In a preferred embodiment, the degree of opening of the valve passageway is given by the valve stroke. The advantage of this is that it is easy to determine. In the simplest case, the valve stroke is constituted by a valve mounted slide device which partially seals off the valve passageway depending on its position. The opening of the valve passageway is determined by the drawing in or out of the slide opening.

Preferably the operating data for a line without deposits is determined and stored, different parameters of the plant being varied. The data is then used to determine the extent of the deposits. This operating data represents a better initial basis than e.g. the operating data specified by the factory, as it also enables the special features of the plant to be taken into account.

As a reference, setpoint characteristic curves are preferably calculated from the operating data as the fuel flow reference function. With conditions such as compressor air temperature otherwise remaining the same, these setpoint characteristic curves are suitable for plotting thereon the measured degree of opening of the valve. This now yields the amount of fuel theoretically flowing for that degree of opening (without deposits in the line). This can be used as a measure for determining the deposits.

In a preferred embodiment the reference function is normalized. Normalization of this function is advantageous, as during gas turbine operation the output and therefore the fuel flow required depends not only on the output setpoint but also on the compressor air temperature. This makes long-term monitoring possible.

Monitoring of the deposits is preferably carried out continuously. Continuous monitoring makes it possible to intervene in good time in the event of very heavy deposition or accumulations of deposits which adversely affect the flow behavior of the fuel.

By means of the setpoint characteristic curve, the flow through the valve theoretically matched to the setpoint characteristic curve is preferably calculated from the amount of fuel flowing through the valve. For this purpose, e.g. the degree of opening of the valve is measured, and this is plotted on the setpoint characteristic curve. This yields the fuel flow for a clean line. As the next step, this theoretically calculated fuel flow through the valve is compared with the actual flow.

In a preferred embodiment the fuel is delivered by a fuel line. This can be embodied such that other fuel feed lines can also be supplied.

In another preferred embodiment at least one burner stage in a combustion chamber is operated using the fuel, wherein a mixture of air and fuel is burned to produce hot gas. The fuel flow is controlled via the valve opening.

Preferably at least two parallel burner stages in a combustion chamber are operated using the fuel, at least one of the burner stages being operated as a pilot fuel stage and at least one of the burner stages being operated as a main fuel stage. Particularly in the case of gas turbine plants, these burner stages can be simplified in respect of the method. In combustion chambers with at least two burner stages essentially the total fuel flow is measured. The total fuel flow is split. The major part of the fuel is fed to the main burner stage via a fuel feed line incorporating a valve. Particularly in the case of gas turbines, at full load the proportion of the fuel fed to the main burner stage is approximately 90-95% of the total fuel flow. The remaining 5-10% is fed to the pilot burner stage. This means to a first approximation that the total fuel flow is controlled via the valve in the fuel feed line for the main burner stage.

The method in particular allows the fuel split to be quickly and simply corrected. This is important for stable combustion.

This method is preferably used in a gas turbine. The maintenance-friendly method enables the solid particles and the associated deposits to be monitored but with minimal downtimes.

This device-related object is inventively achieved by a device for monitoring the formation of deposits of solid particles in a fuel feed line with a valve, the line having a measuring device for determining the current fuel flow and a measuring device for determining the current valve position, and an evaluation system, the measuring devices being connected to the evaluation system. The device is particularly suitable for carrying out the above-described method. The advantages of the method therefore also apply to the device.

The evaluation system preferably comprises a calculating unit for determining the setpoint operating data in a deposit-free line.

In a preferred embodiment, the evaluation system comprises a calculating unit for calculating the fuel flow through the valve matched to the setpoint operating data for the theoretical fuel flow through the valve.

In a preferred embodiment the evaluation system comprises a calculating unit for calculating the difference between theoretical fuel flow rate and current flow rate.

In addition to the one fuel feed line, at least one other fuel feed line with a valve is preferably provided.

In a preferred embodiment the fuel feed line is embodied with a fuel line for delivering the fuel.

BRIEF DESCRIPTION OF THE DRAWINGS

The invention will now be explained in greater detail with reference to the accompanying drawings which are simplifications and not to scale and in which.

Identical parts are provided with the same reference characters in all the figures.

DETAILED DESCRIPTION OF INVENTION

Figure 1:
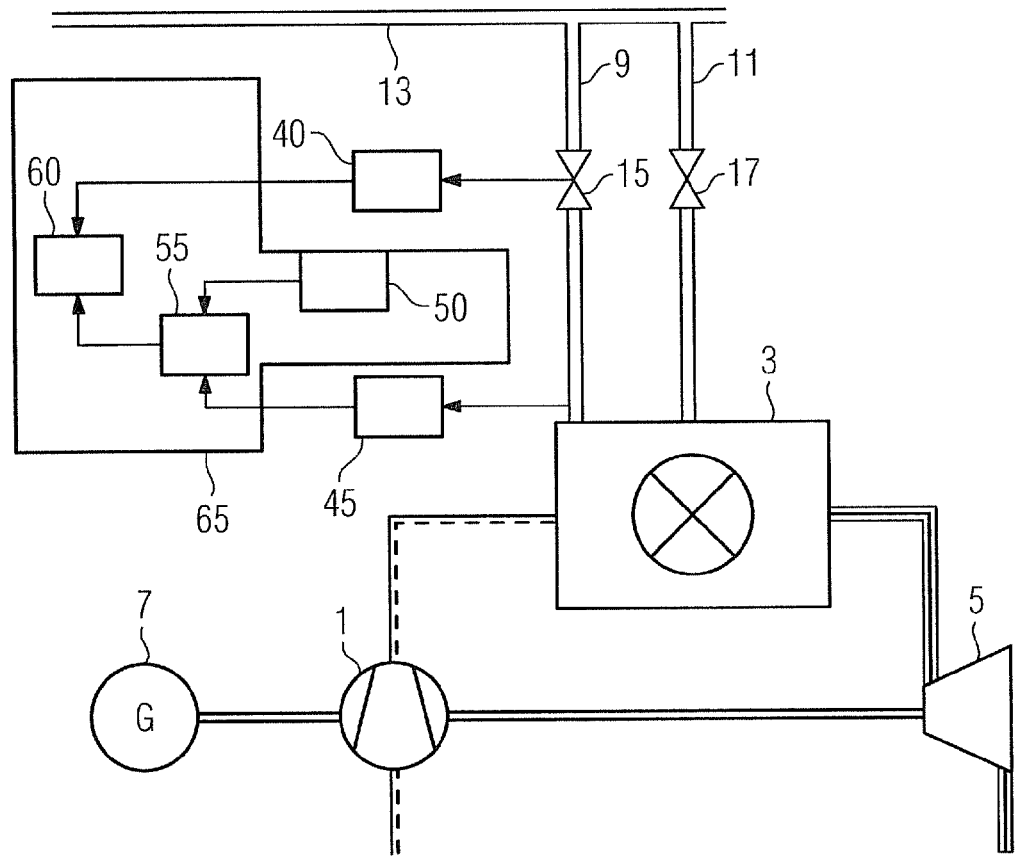
FIG. 1 shows the device and the method for monitoring the formation of deposits of solid particles

FIG. 1 schematically illustrates a gas turbine plant comprising a compressor 1, a combustion chamber 3 and a turbine 5 which is linked to a generator 7. The air compressed in the compressor 1 is fed to the combustion chamber 3 where it is burned with fuel, the combustion exhaust gases being fed to the turbine 5. Thermal energy is extracted from the combustion exhaust gases and converted into mechanical energy by the turbine 5. Electric power is generated by means of the generator 7.

The method and the device for monitoring the formation of deposits of solid particles will likewise be explained with reference to FIG. 1 which shows a burner with two burner stages, a main burner stage and a pilot burner stage. Particularly for gas turbines, the proportion of fuel fed to the main burner stage is approximately 90-95% of the total fuel flow. The remaining 5-10% is fed to the pilot burner stage. To a first approximation, the total fuel flow is controlled via the valve 15 of the fuel feed line 9 for the main burner stage. On the basis of the operating data for a clean machine, i.e. for deposit-free lines, the setpoint operating data are now determined as a function of the relevant valve stroke and the fuel flow through the valve. These are used to produce setpoint characteristic curves.

Fuel to be burned in the combustion chamber 3 is fed via a fuel delivery line 13 to two fuel feed lines 9, 11, shown here by way of example as fuel feed line 9 for the main burner stage and the line 11 for the pilot burner stage. Inside the fuel feed lines are two fuel control valves 15,17 which control the fuel flow. The current valve stroke is determined via a measuring device 40, the current fuel flow through the valve via a measuring device 45. If deposits now form in the line 9, this results in a small effective cross section of the line 9. This is associated with a disturbed flow of fuel to the combustion chamber 3. To compensate for this, i.e. to feed the required amount of fuel to the combustion chamber 3, the stroke of the valve 15 is increased, i.e. the valve 15 is opened wider than would be necessary for a deposit-free line 9 under the same conditions. The measuring unit 45 and the measuring unit 40 are connected to an evaluation system 65. This consists of a plurality of calculating units, 50,55,60. The measuring unit 45 is connected to the calculating unit 55. The calculating unit 55 is also connected to a calculating unit 50 in which the setpoint operating data and the setpoint characteristic curves are stored. The current fuel flow through the valve 15 obtained from the measuring unit 45 is plotted on the setpoint characteristic curve. This yields the theoretically required valve stroke for a deposit-free line 9 for that fuel flow. The theoretically required valve stroke now corresponds to the valve stroke for a deposit-free line 9. In a downstream calculating unit 60, the theoretically required valve stroke is compared with the currently measured valve stroke which was determined in the measuring unit 40. This comparison constitutes the measure for the deposits in the line 9. From this data can likewise be determined the difference between the current fuel flow though a deposit-fouled line 9 and the theoretical fuel flow through a deposit-free line 9. This enables the deposits in the line 9 to be monitored without visual inspection. It also allows continuous monitoring. Thus proactive measures can be taken in good time if the line 9 becomes clogged by deposits. However, the plant remains available during this monitoring. This method also allows the deposits in the upstream fuel lines, e.g. the fuel line 13, to be determined.

Figure 2:
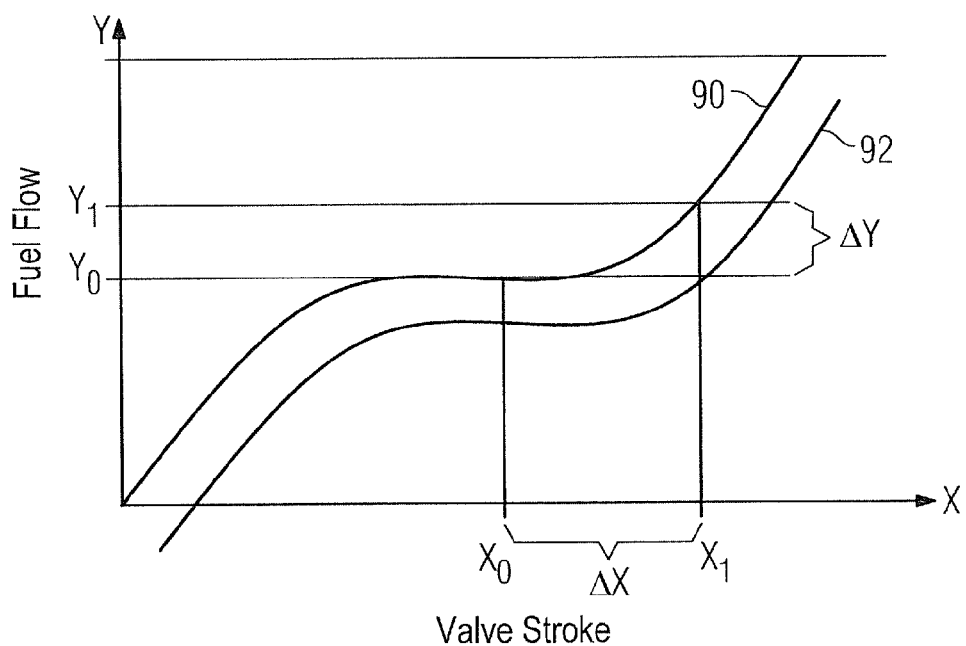
FIG. 2 shows a typical setpoint and actual characteristic curve.

FIG. 2 shows a characteristic curve for the operating data of a deposit-free line 9, the setpoint characteristic curve 90, and also the characteristic curve of a deposit-fouled line 9, the actual characteristic curve 92. Both characteristics 90,92 are represented as a function of the valve stroke which is plotted in the X-direction, and as a function of the fuel flow which is plotted in the Y direction. The setpoint characteristic curve 90 specifies the valve stroke as a function of the fuel flow for a deposit-free line 9. In the burner, the fuel flow $Y_0$ is required, for example. During operation of the fuel line 13, deposits accumulate in the line 9. This displaces the setpoint characteristic curve 90, as the valve 15 must be opened wider in order to achieve the same fuel flow $Y_0$ in the burner. This shift is represented by the actual characteristic curve 92. By means of the measuring device 40, the current valve stroke $X_1$ is now measured at the required fuel flow $Y_0$ admitted. By means of the setpoint characteristic curve 90, the theoretically required valve stroke $X_0$ is determined. This is now compared with the current valve stroke $X_1$. The difference $\Delta X$ between the two valve strokes $X_1, X_0$ constitutes a measure for the deposits in the line 9. For an essentially equal flow resistance in the line 9, by plotting the current valve stroke $X_1$ on the setpoint characteristic curve 92 the difference $\Delta Y$ between the fuel flow $Y_0$ admitted and the amount of fuel $Y_1$ theoretically admitted in a deposit-free line 9 is known. This is likewise a measure for the deposits in the line 9 and can be used for monitoring said deposits.

The invention relates to a method and a device for monitoring the formation of deposits of solid particles in a fuel feed line. This enables clogging of the lines or valves to be monitored in order to initiate proactive measures in good time. It is not necessary to shut the plant down. In addition, the invention can also be used to correct the fuel split simply and quickly.

The invention claimed is:

1. A method for monitoring the formation of deposits of solid particles in a fuel feed line incorporating a valve, comprising:

determining a current degree of opening of the valve passageway;

determining a current fuel flow through the valve; and calculating a measure for the deposits of solid particles in the fuel feed line by comparing the current degree of opening of the valve passageway and the current fuel flow through the valve with respective previously established reference values characterizing a deposit-free line.

2. The method as claimed in claim 1 wherein the degree of opening of the valve passageway is given by the valve stroke.

3. The method as claimed in claim 1 wherein the operating data for a line without deposits is determined and stored.

4. The method as claimed in claim 3, wherein setpoint characteristic curves are calculated from the operating data as a reference function of the fuel flow.

5. The method as claimed in claim 4, wherein the reference function is normalized.

6. The method as claimed in claim 5, further comprising:

calculating from the fuel flow through the valve, via the setpoint characteristic curve, the flow through the valve theoretically matched to the setpoint characteristic, and comparing the theoretically calculated fuel flow through the valve with the actual flow.

7. The method as claimed in claim 5, wherein monitoring of the deposits is carried out continuously.

8. The method as claimed in claim 7, wherein the fuel is delivered by a fuel line.

9. The method as claimed in claim 8, wherein a burner stage in a combustion chamber is operated using the fuel.

10. The method as claimed in claim 1, wherein a plurality of parallel burner stages in a combustion chamber are operated using the fuel, and at least one of the burner stages is operated as a pilot fuel stage and at least one of the burner stages is operated as a main fuel stage.

11. The method as claimed in claim 10, wherein the a fuel split between the pilot fuel stage and the main fuel stage is correctable.

12. The method as claimed in claim 11, wherein fuel feed line feeds a burner of a gas turbine.

13. A device for monitoring the formation of deposits of solid particles in a fuel feed line incorporating a valve, comprising:

a measuring device for determining the current fuel flow in the fuel feed line;

a further measuring device for determining the current valve position;

an evaluation system connected to the measuring devices that calculates a measure for the deposits of solid particles in the fuel feed line by comparing the current degree of opening of the valve passageway and the current fuel flow through the valve with respective previously established reference values characterizing a deposit-free line.

14. The device as claimed in claim 13, wherein the fuel is gaseous.

15. The device as claimed in claim 13, wherein the fuel is liquid.

16. The device as claimed in claim 13, wherein the evaluation system comprises a calculating unit for determining the operating data in a deposit-free line.

17. The device as claimed in claim 13, wherein the evaluation system comprises a calculating unit for calculating the theoretical fuel flow through the valve, matched to the deposit-free operating data, for the fuel flow through the valve.

18. The device as claimed in claim 13, wherein the evaluation system has a calculating unit for calculating the difference between theoretical fuel flow and current fuel flow.

19. The device as claimed in claim 13, wherein in addition to the one fuel feed line and at least one other fuel feed line with a valve is provided.

20. A gas turbine engine, comprising:

a compressor that compresses a working fluid;

a combustion chamber that receives the compressed working fluid, combusts a fuel and produces a hot working fluid, wherein the combustion chamber has a burner that delivers a fuel for combustion to the combustion chamber, a fuel feed line incorporating a valve, the fuel feed line connected to the burner such that the feed line feeds the burner with fuel and has:

a measuring device for determining the current fuel flow in the fuel feed line, a further measuring device for determining a current valve position;

an evaluation system connected to the measuring devices that calculates a measure for the deposits of solid particles in the fuel feed line by comparing the current degree of opening of the valve passageway and the current fuel flow through the valve with respective previously established reference values characterizing a deposit-free line; and a turbine section that expands the hot working fluid and extracts mechanical work.

* * * * *